(No Model.)
E. R. KNIGHT.
SEED PLANTER.
No. 483,066. Patented Sept. 20, 1892.
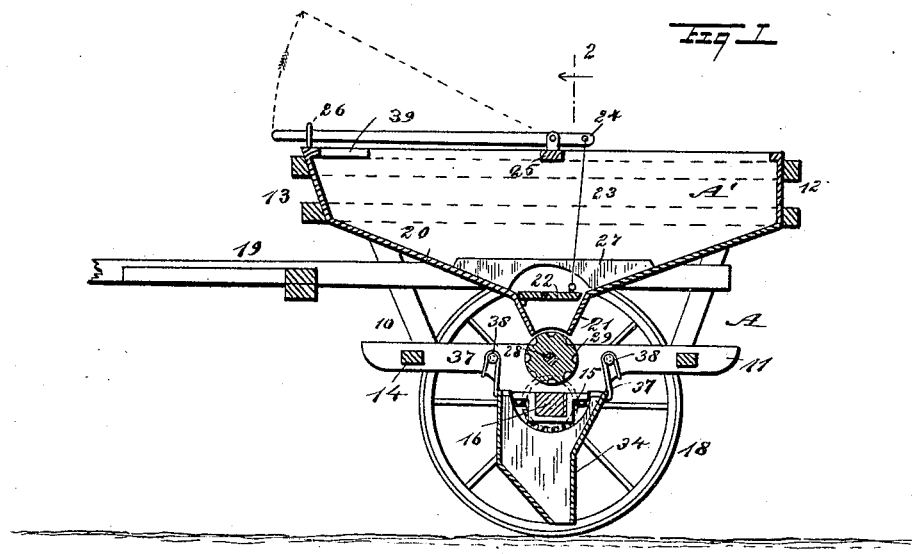
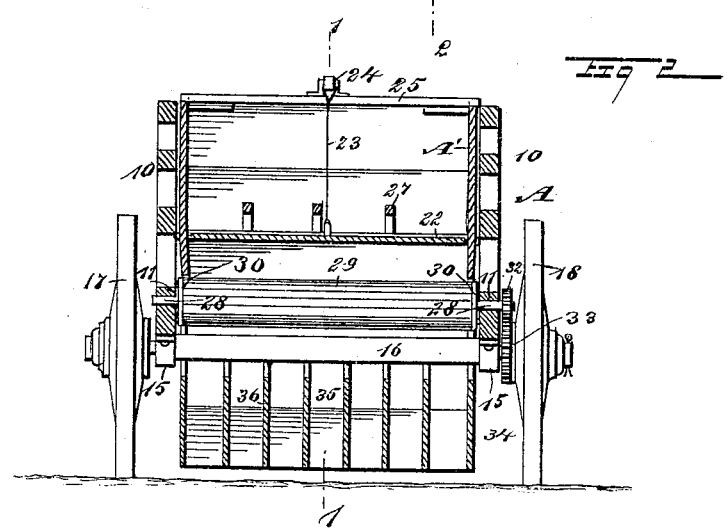
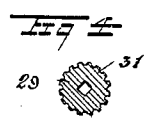
WITNESSES:
J. Walker
C. Sedgwick
INVENTOR
E. R. Knight
BY Munn & Co.
ATTORNEYS.

UNITED STATES PATENT OFFICE.

EBENEZER R. KNIGHT, OF ST. JOHNS, CANADA.

SEED-PLANTER.

SPECIFICATION forming part of Letters Patent No. 483,066, dated September 20, 1892.

Application filed April 19, 1892. Serial No. 429,714. (No model.)

*To all whom it may concern:*

Be it known that I, EBENEZER R. KNIGHT, of St. Johns, Canada, have invented a new and useful Improvement in Seed-Planters, of which the following is a full, clear, and exact description.

My invention relates to an improvement in eed-planters, especially to that class of implement used for sowing seed broadcast; and the object of the invention is to provide an implement of simple and economic construction and capable of being used for sowing seed of any variety that is to be scattered broadcast, and to provide a means whereby he seed may be protected in windy weather when dropping to the ground, and also whereby the seed may be carried in bulk from any storage-compartment to the field without danger of spilling the seed, and whereby, further, whatever seed is not sown may be safely returned to the place from whence it was taken.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a vertical longitudinal section taken about centrally through the implement upon the line 1 1 of Fig. 2. Fig. 2 is a transverse vertical section through the implement, taken, practically, on the line 2 2 of Fig. 1. Fig. 3 is a detail sectional view of a portion of the seed-distributing cylinder, illustrating the manner in which it is removably attached to its axle; and Figs. 4 and 5 are transverse sections taken through cylinders adapted for sowing different kinds of grain.

The body A of the implement is of crib-like structure and comprises two lattice-work sides 10, each emanating from a base-beam 11, the lattice-work sides being connected at front and back by cross-beams designated, respectively, as 12 and 13, and the sides are further connected by cross-bars 14, uniting the base-beams 11. The latter beams carry brackets 15, through which the axle 16 of the implement is passed, and upon the outer ends of the axle supporting-wheels 17 and 18 are loosely mounted, the latter wheel being also adapted as a drive-wheel. The shafts 19 are attached to the body in any suitable or approved manner. The crib-like body is especially adapted to support a seed-box A'. This box is usually open at the top, and its bottom 20 slopes from the front and rear ends toward the center and meets a downwardly-extending trough 21, located at the bottom portion of the box at the center transversely thereof, as shown in Fig. 1. Thus the seed when placed in the box A' will constantly shift in direction of the trough 21; but the seed may be effectually prevented from entering the trough through the medium of a valve 22, which is fulcrumed at one side of its center over the trough in such a manner that when the valve is in a horizontal position it will to all intents and purposes completely close the top of the trough. The valve is held in the horizontal position above noted by a rope or chain connection 23 with a lever 24, and this lever is usually fulcrumed about centrally upon a cross-bar 25, reaching over the upper central portion of the box. When the lever is in the horizontal position shown in positive lines in Fig. 1, in which position it may be held by the engagement of the lever with a suitable clasp 26, attached to the front of the box, the valve is likewise in a horizontal position; but when the lever is released from its clasp 26 the end of the valve with which the lever is connected will automatically drop downward and the valve will assume a vertical position and permit the seed to fall down freely into the trough 21.

In order that the seed in the box A' shall not have too much side movement, longitudinally-located barriers 27 are secured to the bottom of the box, the said barriers bridging the trough, and their under faces are recessed in such a manner as to permit the valve to assume its vertical position without obstruction.

Immediately beneath the trough 21 in the base-beams 11 of the crib-like body a shaft 28 is journaled, the body portion of which shaft is polygonal in cross-section. This shaft is adapted to carry between the sides of the body a seed-distributing drum or cylinder 29, the drum being provided with a central bore corresponding in cross-sectional shape to the equivalent cross-sectional shape of the shaft, so that the drum will revolve with the shaft, and the ends of the drum are protected by means of attached plates 30. The drum is provided with a series of peripheral longitudinal channels or pockets 31, and these pockets may be more or less closely grouped, or may be comparatively few in number, or they may be deep or shallow, according to the character of the seed they are adapted to carry.

In Fig. 4 I have illustrated in cross-section a cylinder or drum adapted for use in planting hay-seed thickly or other seed of like character, and in Fig. 1 the arrangement of the pockets or channels is such as to be efficacious in sowing hay-seed or seed of like character quite sparingly, while in Fig. 5 a cylinder is shown in cross-section the pockets of which are arranged with a view to planting oats, or wheat, corn, or like grain.

It will be understood that any one of the distributing-cylinders may be removed from the shaft by simply drawing the shaft out from the cylinder, and the cylinder-shaft is given a rotary movement by attaching to one end a pinion 32, meshing with a gear 33, the latter being attached to the hub or spokes of the supporting-wheel 18. Thus, as heretofore stated, this wheel acts as a drive-wheel.

In windy weather it is necessary that some provision should be made to prevent seed when falling from the distributing-drum from blowing some distance from the machine before falling to the ground, as in planting it is intended that the seed should drop more or less perpendicularly. To that end a spout 34 is provided, which is of sufficient length to extend beneath the distributing-drum from end to end thereof, and preferably this spout when used is divided into a number of compartments 35, as shown in Fig. 2, by a series of vertical partitions 36. The spout is not intended to reach to the ground and is removably attached to the implement. The preferred attaching mediums consist of links 37, attached to the upper corners of the spout, which links are passed over pins 38 or their equivalents secured to the base-beams of the crib-like body, as is best shown in Fig. 1, as when such an attaching device is employed, should the spout strike a stone or other obstruction, it may be carried up a sufficient distance to clear the stone or obstruction without becoming detached from the body of the implement. The box A' at its forward end is usually provided with one or more seats 39.

Having thus described my invention, I claim as new and desire to secure by Letters Patent—

1. In a broadcast sower, the combination, with a wheel-supporting frame and a seed-box carried by the frame and having a bottom inclined in direction of its center and provided at its center with a chute, of a valve located above the chute, a lever connected with the valve, a seed-delivery drum or cylinder held to revolve beneath the chute of the seed-box and provided with peripheral grooves or pockets, and a driving mechanism between one of the supporting-wheels of the frame and the seed-distributing cylinder, as and for the purpose set forth.

2. In a broadcast sower, the combination, with a wheel-supported crib-like frame, a seed-box carried by the frame and having its bottom inclined downward in direction of the center, and a trough formed transversely at the central portion of the bottom, of a valve pivotally located above the trough, the pivot being at one side of the center of the end portions of the valve, a lever carried by the body and connected with the valve, a locking device adapted for engagement with the lever, a shaft located below the trough of the seed-box and actuated from one of the frame-supporting wheels, and a seed-delivery drum mounted upon the shaft to turn therewith, the said drum being detachable from the shaft and provided with a series of longitudinal peripheral pockets, as and for the purpose specified.

3. In a broadcast sower, the combination, with a wheel-supported body or frame, a seed-box carried by the body or frame and having its bottom inclined from its ends downward to the center, a trough formed at the central portion of the bottom of the seed-box, a pivoted valve located above the trough, a lever carried by the seed-box and connected with the valve, and partitions located longitudinally upon the bottom of the seed-box, the said partitions being adapted to prevent excessive movement of the seed in the direction of the sides of the box, of a shaft journaled in the frame below the trough and actuated from one of the frame-supporting wheels, a seed-delivery drum carried by the shaft and removable therefrom, said seed-drum being provided with a series of longitudinal pockets in its peripheral surface, and a spout located beneath the drum and having a link connection with the frame of the implement, as and for the purpose specified.

EBENEZER R. KNIGHT.

Witnesses:
WILLIAM BRIGHT,
ROBERT SEXTON.

It is hereby certified that the residence of the patentee in the grant and in the printed specification of Letters Patent No. 483,066, granted September 20, 1892, upon the application of Ebenezer R. Knight for an improvement in "Seed-Planters," was erroneously written and printed "St. Johns, Canada," whereas said residence should have been written and printed *St. Johns, Newfoundland*, and that the said Letters Patent should be read with this correction therein that the same may conform to the record of the case in the Patent Office Signed, countersigned, and sealed this 8th day of November, A. D. 1892.

[SEAL.]

CYRUS BUSSEY
*Assistant Secretary of the Interior.*

Countersigned:
   N. L. FROTHINGHAM,
      *Acting Commissioner of Patents.*